US010454356B2

(12) United States Patent
Borghi et al.

(10) Patent No.: US 10,454,356 B2
(45) Date of Patent: Oct. 22, 2019

(54) DRIVE SYSTEM WITH ELECTROMAGNETIC ENERGY TRANSFER

(71) Applicant: Tetra Laval Holdings & Finance S.A., Pully (CH)

(72) Inventors: Davide Borghi, Modena (IT); Stefano Flore, Bologna (IT); Claudio Bianchini, Reggio Emilia (IT); Matteo Davoli, Reggio Emilia (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/755,568

(22) PCT Filed: Sep. 19, 2016

(86) PCT No.: PCT/EP2016/072114
§ 371 (c)(1),
(2) Date: Feb. 27, 2018

(87) PCT Pub. No.: WO2017/055120
PCT Pub. Date: Apr. 6, 2017

(65) Prior Publication Data
US 2018/0248460 A1 Aug. 30, 2018

(30) Foreign Application Priority Data

Oct. 1, 2015 (EP) .................... 15187836

(51) Int. Cl.
*H02K 41/03* (2006.01)
*B60L 13/03* (2006.01)
(Continued)

(52) U.S. Cl.
CPC ............ *H02K 41/033* (2013.01); *B60L 13/03* (2013.01); *H02K 41/03* (2013.01); *B29C 33/34* (2013.01);
(Continued)

(58) Field of Classification Search
CPC ...... H02K 41/033; H02K 41/03; H02K 19/12; H02K 19/28; B29C 33/34; B29C 66/8244;
(Continued)

(56) References Cited

U.S. PATENT DOCUMENTS 5,249,191 A * 9/1993 Sawaki .................. G02F 1/3775
359/328
5,412,502 A * 5/1995 Makio ................... G02F 1/3558
359/328

(Continued)

FOREIGN PATENT DOCUMENTS

RU 2454774 12/2012
WO WO 93-02888 2/1993
(Continued)

OTHER PUBLICATIONS

Decision to Grant and Search Report from corresponding Russian Application No. 2018107844 dated Jun. 19, 2018.
(Continued)

*Primary Examiner* — Alex W Mok
(74) *Attorney, Agent, or Firm* — Finnegan, Henderson, Farabow, Garrett & Dunner LLP (57) ABSTRACT

The invention relates to a drive system (1) with electromagnetic energy transfer. The system (1) comprises a track (3) comprising a plurality of stators (4), each stator (4) having at least one winding adapted to generate a magnetic field having a fundamental harmonic (8) and at least one further harmonic (9) when fed with an varying current, and a movable element (2) comprising a primary magnetic element (5) adapted to receive said fundamental harmonic (8) to drive said movable element (2) along said track. The system (1) is characterized in that said movable element (2) further comprises a secondary magnetic element (6a-6c) adapted to receive said at least one further harmonic (9) to (Continued)

generate power onboard of said movable element (2). The invention also relates to a linear fractional slot synchronous machine and a rotational synchronous machine.

18 Claims, 4 Drawing Sheets

(51) Int. Cl.
| | | |
|---|---|---|
| H02K 19/12 | (2006.01) | |
| H02K 19/28 | (2006.01) | |
| B29C 33/34 | (2006.01) | |
| B29C 65/00 | (2006.01) | |
| B29L 31/00 | (2006.01) | |

(52) U.S. Cl.
CPC ........ *B29C 66/8244* (2013.01); *B29C 66/849* (2013.01); *B29L 2031/712* (2013.01); *H02K 19/12* (2013.01); *H02K 19/28* (2013.01)

(58) Field of Classification Search
CPC ... B29C 66/849; B29L 2031/712; B60L 13/03
USPC ..................................................... 310/12.18
See application file for complete search history.

(56) References Cited

U.S. PATENT DOCUMENTS

| | | | | |
|---|---|---|---|---|
| 5,619,369 | A | * | 4/1997 | Yamamoto ............. G02B 6/124 359/328 |
| 2011/0031840 | A1 | | 2/2011 | Huth et al. |
| 2014/0232209 | A1 | * | 8/2014 | Sugita ................. H02K 41/033 310/12.02 |

FOREIGN PATENT DOCUMENTS

| | | |
|---|---|---|
| WO | WO 2006-048441 | 5/2006 |
| WO | WO 2015-101492 | 7/2015 |

OTHER PUBLICATIONS

International Search Report and Written Opinion from corresponding PCT Application No. PCT/EP2016/072114 dated Nov. 14, 2016 (17 pages).
Chen et al., "Inductive power transferring in maglev using harmonic injection method," 2004 IEEE Applied Power Electronics Conference and Exposition. IEEE, vol. 2, Feb. 22, 2004. (pp. 1165-1170).
Iwahana et al., "Harmonic Flux Induction Type on-Board Auxiliary Power Source System for Levitated Trains," Transactions on Power Apparatus and Systems. IEEE Inc. vol. PAS-100, No. 6, Jun. 6, 1981, (pp. 2898-2906).

* cited by examiner

DRIVE SYSTEM WITH ELECTROMAGNETIC ENERGY TRANSFER

CROSS-REFERENCE TO RELATED PATENT APPLICATIONS

This is a National Phase of International Application No. PCT/EP2016/072114, filed Sep. 19, 2016, which claims the benefit of European Application No. 15187836.0, filed Oct. 1, 2015. The entire contents of the above-referenced applications are expressly incorporated herein by reference.

TECHNICAL FIELD

The invention relates to a drive system with electromagnetic energy transfer. The invention also relates to a linear fractional slot synchronous machine and a rotational synchronous machine. The aim is to do energy harvesting on board a movable element of a servo brushless motor in order to generate electrical power on the moving element for different usages, depending on application.

BACKGROUND ART

In the food packaging industry packages are manufactured and filled with food in large machines transforming packaging material into packages which are filled with food content, either during the formation of the package or after the package has been created. In these packaging machines, packages and equipment for handling the packages or the packaging material need to be conveyed.

WO 2015/101492 discloses a solution for the problem of molding plastic objects onto cardboard-based packaging material intended to form packages while the packaging material is conveyed. Multiple molding stations are pulled by a linear synchronous motor along an annular track such that the molding stations are aligned over a moving sheet of packaging material. For a period of time a moving molding station is aligned to an area of the packaging material so as to mould an object on said area. This solution has the advantage that work can be made on the packaging material without stopping the feeding of the packaging material in a packaging machine. In addition, precise alignment of each molding station with the corresponding area of the packaging material can be achieved.

In WO 2015/101492 the molding stations are operated by cams in a mechanical manner. In other situations, however, the operation that is to be performed on the packages needs electrical power. Such electrical power transfer to moving objects has traditionally been accomplished with brush connectors. Brush connectors are however a mechanical solution that is subject to wear and leads to maintenance needs.

WO 2006/048441 shows a solution where the brush connectors have been replaced by an induction energy transfer system to provide sealing jaws moving along a chain in a packaging machine with power to perform an induction heating operation.

WO 93/02888 discloses a further enhanced system for linear drive of vehicles using a synchronous linear motor where electric power is transferred to each moving vehicle using induction. This solution uses the same electromagnetic mechanism that is used by the synchronous linear motor for movement of the vehicles to also transfer electrical power. In a synchronous linear motor, a field of travelling waves is generated in individual sections of a long stator opposite to an exciter part located on a vehicle. The field of travelling waves cooperates with the field generated in the exciter winding by direct current supply, so as to move the vehicle forward. The alternative current supplied to the stator section in order to generate the field of travelling waves induces practically no voltage in the exciter winding. In order to ensure an inductive energy transfer, a higher-frequency alternative current is superimposed on the alternative current available to generate the field of travelling waves. The higher-frequency alternative current induces a high-frequency voltage in the exciter winding that can be considered as the secondary winding of a transformer comprising the stator winding and the exciter winding. This solution for wireless transfer of electrical power to a moving vehicle is, however, complicated and expensive due to the need of a non-standard power-supply or the use of multiple power supplies for achieving the alternative current for moving the vehicles with a high frequency alternative current superimposed for transferring electrical power.

Based on the above, there is a need for a simpler solution for transferring electrical power to vehicles in a linear synchronous motor.

SUMMARY OF THE INVENTION

It is an object of the present invention to improve the current state of the art, to solve the above problems, and to provide an improved drive system with electromagnetic energy transfer.

According to a first aspect of the invention, these and other objects are achieved in full, or at least in part, by a drive system with electromagnetic energy transfer. The system comprises a track comprising a plurality of stators, each stator having at least one winding adapted to generate a moving (translating or rotating) magnetic field having a fundamental harmonic, sub-harmonics, and high order harmonics, when fed with a varying current having a selected waveform. The system also includes a movable element comprising a primary magnetic element adapted to receive said fundamental harmonic to drive said movable element along said track. The system is characterized in that said movable element further comprises a secondary magnetic element adapted to receive a further harmonic, preferably a sub-harmonic, to generate power onboard of said movable element.

The varying current preferably varies periodically in accordance with a periodic waveform. The waveform can be sinusoidal, square or triangular or any other shape suitable for driving the synchronous machine via the stators. The varying current is preferably an alternating current, i.e. a current periodically changing direction, wherein the waveform is centered to the potential zero. The alternating current preferably has a sinusoidal waveform shape since that is the conventional waveform shape for driving a synchronous machine.

The primary magnetic element is intended to be pulled by the magnetic field produced by the plurality of stators and thereby move the moveable element.

The primary magnetic element may be a permanent magnet or an electromagnet or a magnetic circuit. To reduce the energy needed by the moveable element, the primary magnetic element is preferably a permanent magnet.

The secondary magnetic element may be a magnetic circuit. In particular, the secondary magnetic element is a winding made by a wire with high electrical conductivity, like a copper wire. The purpose of the secondary magnetic element is to induce a current in the wire of the winding from the magnetic field of a further-harmonic, preferably the first sub-harmonic. The winding is further preferably wound in several turns to form a coil for increasing the current that is induced by the magnetic field of the further harmonic.

In the present invention a system for electromagnetic energy transfer in, for example, a synchronous linear machine is addressed that employs the sub-harmonic of the airgap magnetomotive force that is inherent of the electric machine design. It is well-known that fractional slot synchronous machines produce a high harmonic content in the airgap magnetomotive force distribution including sub-harmonic components, and high order harmonics. The moving element of the synchronous machine is linked with the fundamental harmonic of the magnetomotive force, and they have the same translation speed. All the other harmonics have different frequencies, and therefore different speed and directions, with respect to the fundamental harmonic that moves synchronously with the moving element.

With the present invention a parasitic effect is exploited to obtain the energy transfer from the stator to the moving element. In this way the moving element is exploiting the sub-harmonics of the stator, in order to harvest energy, and generate power onboard. Note that the sub harmonics are anyhow present as an intrinsic characteristic of the motion control system, as a consequence of the fractional slot electric machine topology, used for generating motion in the movable element (of a synchronous motor). The invention is leveraging on said sub harmonics, in order to generate electrical power onboard the movable element (of a brushless motor), that would otherwise be completely unused and considered as losses. The amplitude of the harmonics decreases as the harmonics order increases. For this reason, preferably only the sub-harmonics are used in order to obtain a significant energy transfer effect. The principal benefit is that the system will be able to generate power onboard of the movable element without adding any additional primary magnetic element, circuit or high frequency harmonic current injection. The secondary electric-magnetic element(s) or circuit(s) may be embedded in the movable element. In addition to the benefits presented above, the solution is completely wireless.

The movable element may e.g. be an independent cart used in a machine for manufacturing a product or handling material or objects. As described in the background section, independent carts are normally operated by a linear synchronous machine approach well known in the prior art. The stator used for driving the carts in the prior art is optimized to produce a magnetic field with mainly a fundamental harmonic that drives the cart or vehicle as a linear synchronous machine. All other harmonics of the stator are intentionally minimized by design to reduce energy consumption. It is, however, not possible to completely avoid other harmonics than the fundamental harmonic, which leads to energy losses. The present invention makes use of the imperfections of the synchronous machine and uses at least one of the harmonics not used for anything in the prior art for energy transfer to the independent cart/vehicle. Since the first sub-harmonic, below the fundamental harmonic in frequency, normally has the highest amplitude, that sub-harmonic is preferably used. The secondary magnetic element, preferably an induction coil, is designed to induce a current from a magnetic field with a frequency equal to the frequency of the sub-harmonic. In that way a previously unwanted effect in the linear synchronous machine drive stators for an independent cart is used for wireless energy transfer to the independent cart so that electrical equipment can be used on the independent cart.

According to a further aspect of the present invention the width of the windings of the secondary magnetic element is chosen to substantially scale to the distance between subsequent primary magnetic elements as the frequency ratio between the fundamental harmonic to the further harmonic. For example, if the first sub-harmonic has half the frequency of the fundamental harmonic, the width of the windings of the secondary magnetic element is twice the distance between subsequent primary magnetic elements. This will lead to a close to optimal synchronization of the reception of the sub-harmonic, with regard to the speed of the moveable element while, at the same time, the windings of the secondary magnetic element may be placed in the spaces in between the primary magnetic elements.

In one embodiment of the present invention, the movable element comprises a cut-out or slot in a part of the movable element made of high permeability material as e.g. iron. The slot houses the secondary magnetic element, the secondary magnetic element preferably being a coil wound by a wire of a material having a high electric conductivity such as a copper wire. The slot is a way of collecting and concentrating the magnetic flux energy generated by the windings of the secondary magnetic element so as to increase efficiency of the energy transfer from the sub-harmonic.

The moveable element may further comprise a mounting plate onto which the primary magnetic element and the secondary magnetic element are mounted. The slot for receiving the secondary magnetic element is made as a cut-out in the mounting plate. The mounting plate is preferably made of a material with high magnetic permeability such as iron, preferably pure iron to get a high magnetic permeability. The mounting plate will function as a flux concentrator for the secondary magnetic element, especially when the secondary magnetic element is housed in a cut-out slot of the mounting plate.

The system may further comprise a control unit adapted to modulate the current in said stator. This is to enhance or control said sub harmonic used for energy transfer in order to control the generation of power onboard said movable element. The modulation of the sub harmonic may be performed by means of different current control of the drive. Note that the control unit is anyhow present in order to control the motor. This further improvement comprises a modification of the firmware of said control unit, in order to increase one or more sub harmonics, so as to increase the energy transfer to the movable element. In this way the energy transfer to the moveable element may be controlled. The imperfection of the prior art is thus intentionally increased and used for energy transfer in the present invention.

According to a second aspect of the invention, these and other objects are achieved by a linear fractional slot synchronous machine or a rotational synchronous machine comprising a drive system according to the features above. The same advantages as stated above also apply for the second aspect of the invention.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1A:
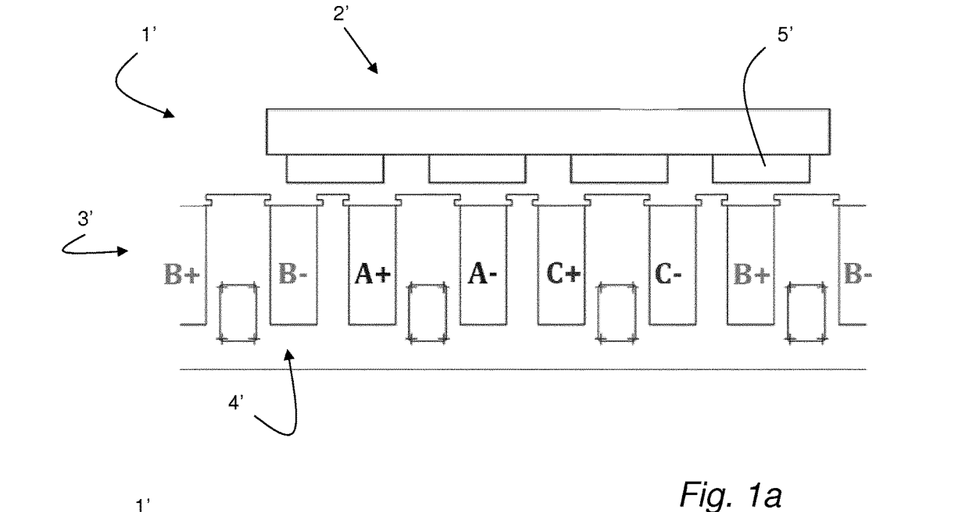
FIGS. 1a and 1b are side views of a linear synchronous machine with a drive system according to known prior art.
Figure 1B:
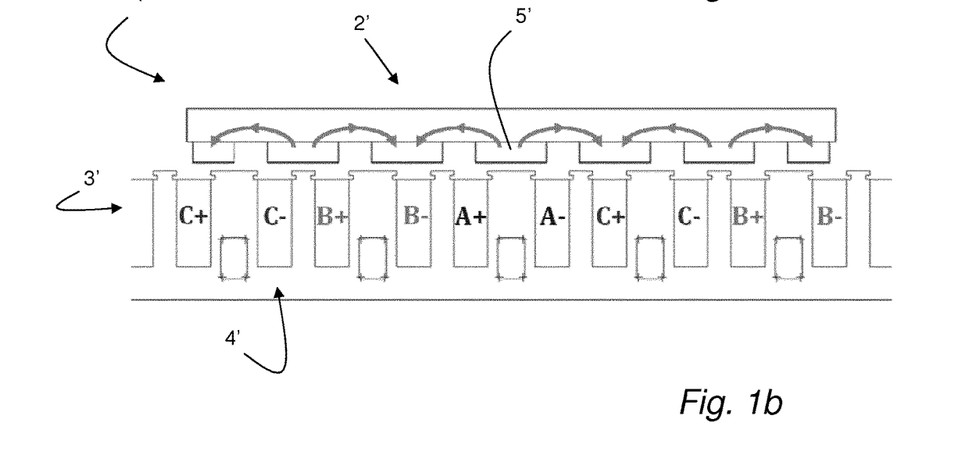

FIG. 1a and FIG. 1b show side views of a linear synchronous machine with a drive system according to known prior art. The drive system 1' for movable elements 2' comprises a track 3' with a plurality of stators 4', wherein each stator 4' has a winding (not shown) fed with a current so as to generate a magnetic field and therefore a magnetic flux. The magnetic flux affects a magnetic element 5' in the movable element 2' so as to pull the movable element 2' in a direction along said track 3'. The current that is fed to the stator windings is an alternating current, e.g. a sinusoidal current with three phases and with a frequency that controls the speed of the moving element 2'. In FIG. 1a and FIG. 1b the three phases are referenced as A, B and C. The phases A, B, C, are fed to succeeding stator windings in the drive system 1' to accomplish a successive movement of the magnetic pull on the moving element 2' and thereby a continuous movement of the moving element 2'.

Figure 2:
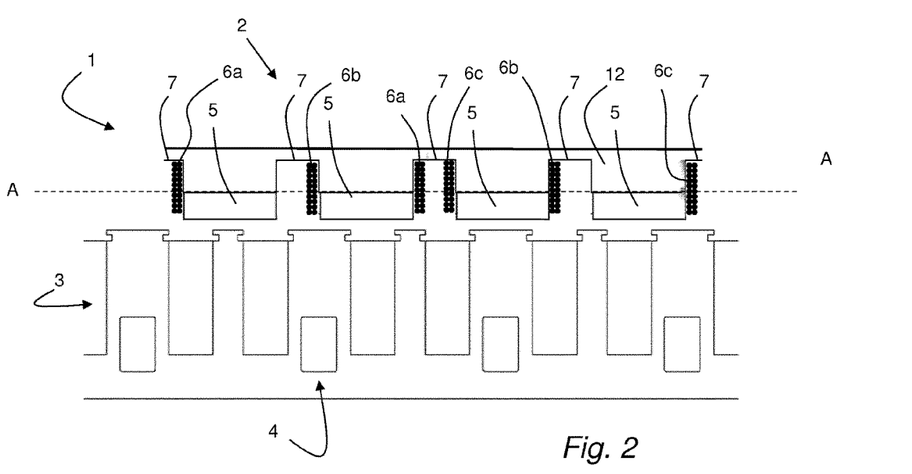
FIG. 2 is a side view of a linear synchronous machine with a drive system according to one exemplary embodiment of the invention.

FIG. 2 is a side view of a linear synchronous machine with a drive system 1 according to one exemplary embodiment of the invention. The drive system 1 for movable elements 2 comprises a track 3 with a plurality of stators 4, wherein each stator has windings (not shown) fed with a current so as to generate a magnetic field and a magnetic flux. The magnetic flux affects a magnetic element 5 in the movable element 2 so as to pull the movable element 2 in a direction along said track 3. The current that is fed to the stator winding is an alternative current, e.g. with three phases with a frequency that controls the speed of the moving element 2. The frequency of the alternating current is typically in the range of 0.2-10 Hz. The phases are fed to succeeding stator windings 4 in the drive system 1 to accomplish a successive movement of the magnetic pull on the moving elements 2.

The moving element in FIG. 2 is further equipped with a secondary electro-magnetic element 6a-6c, which is a winding designed to pick up the energy of the sub-harmonic magnetic wave frequency of the fundamental harmonic of the magnetic field that is used for the movement of the moving element 2. The winding of the secondary magnetic element is designed so as to pick up the variable magnetic flux produced of the sub-harmonic. The parts of the moving element 2 are mounted on an iron plate 12.

The secondary magnetic element 6a-6c is preferably an inductor comprising a coil for collecting the magnetic field of said sub-harmonic. A flux concentrating material of high magnetic permeability is arranged around the coil for increasing the power transfer. In FIG. 2 the flux concentrating material is the mounting plate of the moveable element. Cut-outs 7 in the mounting plate are made to facilitate the winding/coil of the secondary magnetic element 6a-6c.

The windings of the secondary magnetic elements 6a-6c are preferably placed in the space in between the primary magnetic elements 5 so that they can link the flux produced by the sub-harmonic at the same time as the flux produced by the fundamental harmonic is used for pulling the moving element 2. The use of the space in between the primary magnetic elements 5 for the wires of the windings of the secondary magnetic elements 6a-6c makes it possible to place the receiving secondary magnetic elements as close to the stators as the primary magnetic elements 5, thereby increasing efficiency of the energy transfer since the amplitude of the magnetic field from the stators decreases exponentially with the distance from the stators. The moveable element may thus be made very compact since the primary magnetic elements and the secondary magnetic elements 6a-6c are interlaced.

Figure 3:
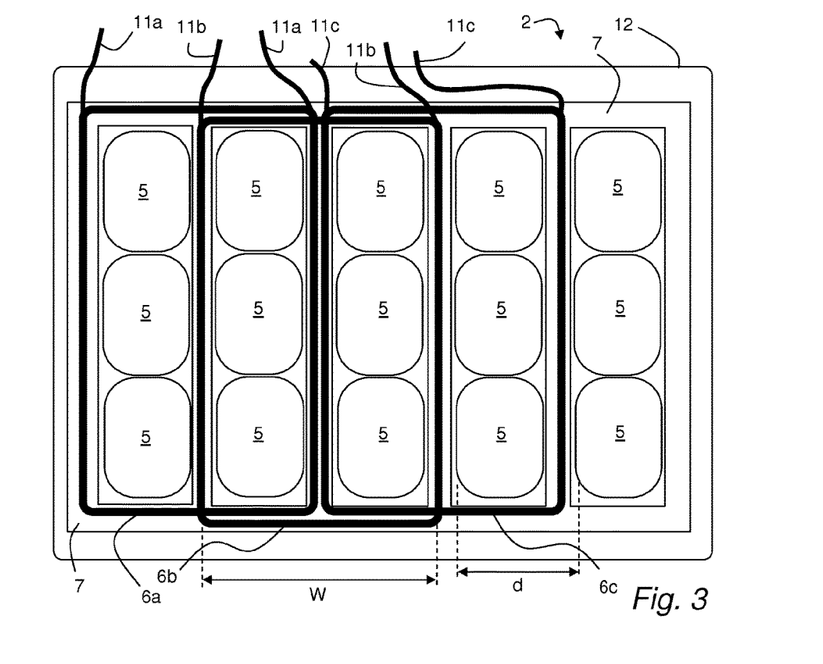
FIG. 3 is a cross-sectional view along the plane A-A in FIG. 2.
Figure 4:
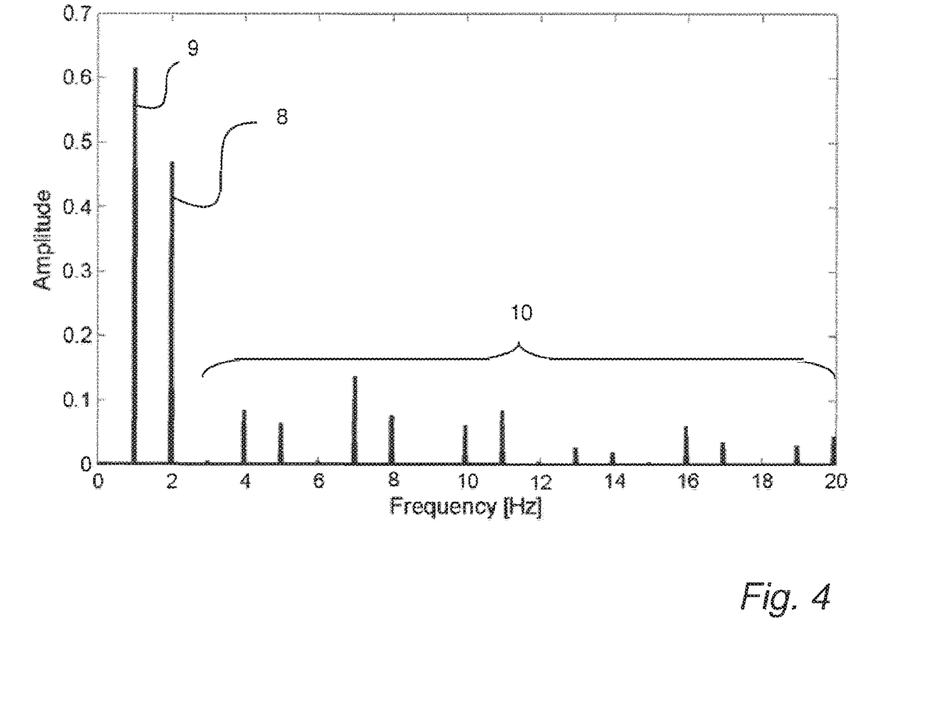
FIG. 4 is a diagram that shows the fundamental harmonic and the sub harmonic generated by a stator of the drive system.

FIG. 3 is a cross-sectional view along the plane A-A in FIG. 2. The windings 6a-6c of the secondary magnetic element 6a-6c are placed in the space in between the primary magnetic elements 5. The primary magnetic elements 5 are separated by a distance d. In the embodiment of FIG. 3, three windings 6a-6c are shown to pick up the sub-harmonic of the stators 4. The use of the space in between the primary magnetic element will ensure a good link of the sub-harmonic if the width W of the windings 6a-6c of the secondary magnetic element substantially is chosen as the frequency ratio between the fundamental harmonic to the further harmonic. For example, if the first sub-harmonic has half the frequency of the fundamental harmonic (as shown in FIG. 4), the width of the windings 6a-6c of the secondary magnetic element should be chosen so as to enclose two primary magnetic elements. The magnetic pull from the fundamental harmonic on the primary magnetic elements 5 will then be synchronized with the inductive reception of the sub-harmonic by the secondary magnetic element.

The current that is induced by the winding of the secondary magnetic elements 6a-6c is fed to a rectifier (not shown) via the connection cables 11a-11c so that a direct current may be used by any electrical equipment on the moveable element 2.

FIG. 4 is a diagram that shows the fundamental harmonic 8 and the further harmonics 9, 10 generated by a stator 4 of the drive system 1. The further harmonics 9, 10 in prior art solutions are imperfections that consume energy that will be lost in iron losses, since only the fundamental harmonic 8 is used for movement of the moving element 2. Energy losses are due to induced eddy currents in materials with magnetic permeability. Because of that, the stator windings configurations of prior art are optimized to minimize the sub-harmonics 9, and higher order harmonics 10, so that the only energy of the alternating current transmitted in form of magnetic field energy is transmitted in the fundamental harmonic 8. It is, however, not possible to build a fractional slot stator winding without having unwanted harmonics and to produce a perfect feeding alternating current, making some losses due to sub-harmonics 9, and higher order harmonics 10, unavoidable.

In the present invention, however, the unavoidable side effects of the sub-harmonics 9 and higher order harmonics 10 are used to transfer energy via the secondary magnetic element 6a-6c of the moving element 2. The previously lost energy of the strongest sub-harmonic 9 of the magnetic field created by the stator windings of the track 3 is recovered by windings of the secondary magnetic element 6a-6c of the moving element 2 and inductively converted to electricity. The power supply (not shown) supplying the stator windings of the track 3 with alternating current may also be controlled to modify the alternating current so as to be "less optimal" for the movement of the moving element 2 and to create a bigger sub-harmonic that can be used for energy transfer to the moving element 2 instead. The strongest sub-harmonic 9 is often, as shown in FIG. 4, the one having half the frequency of the fundamental harmonic 8.

The modification of the feed current and thereby the sub-harmonic 9 can be made manually to transfer a static amount of electrical power to the moving element 2, but it may also be controlled by a control unit or a computer software so as to be able to adjust the power of the energy transferred to the moving element 2. In that case energy may be saved when electricity is not needed on the moving element 2. Some equipment on the moving element 2 could also be directly controlled by the amount of power transferred to the moving element 2.

By using a sub-harmonic 9 of the magnetic field created by the stator windings, no extra parts are needed except for the receiving second magnetic element of the moving element 2. The electrical power transferred to the moving element 2 may e.g. be used for tool in a machine, like sealing jaws of a packaging machine, for cooling of a tool etc. The electrical power generated in said manner, can be further conditioned with electrical means, such as filters and/or DC-DC converters, in order to create DC or AC power usable for industrial purposes onboard the movable element 2.

Figure 5:
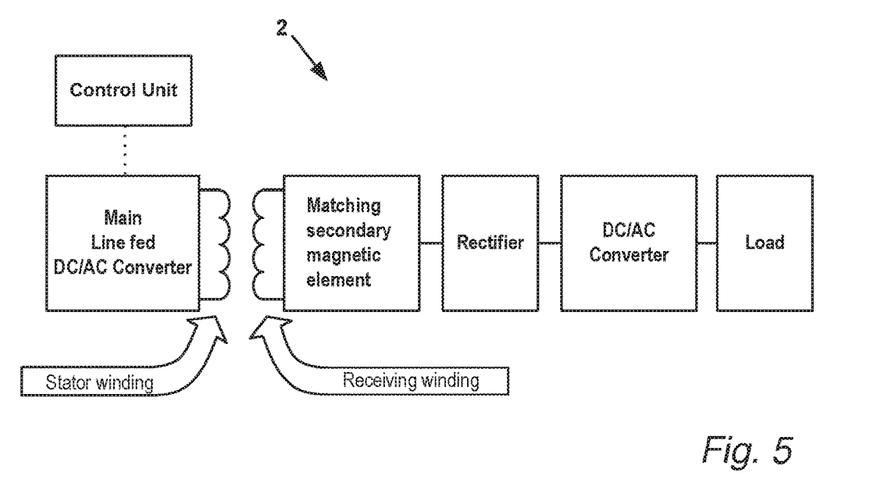
FIG. 5 is a schematic drawing of the inductive power transfer according to the invention.

FIG. 5 is a schematic drawing of the inductive energy transfer. The stator windings of the stators 4 of the drive system 1, located in the track 3 are fed with a three phase alternating current (AC) produced by a DC/AC converter. The AC current in the stators 4 produces a magnetic field with the same frequency of its fundamental harmonic 8 as the frequency of the AC current. The fundamental harmonic 8 is adapted to be linked to the primary magnetic element 5 of the moveable element so as to move the moveable element. Since the frequency of the alternating current feeding the stators 4 determines the speed of the moveable elements 2 of the drive system, the main line fed is arranged to control the frequency of the produced AC and thereby controls the speed of the moveable elements 2 on the track 3 of the drive system of the present invention. As described above, a sub-harmonic 9 to the fundamental harmonic 8 is adapted to be received by the secondary magnetic element 6 via its windings. The current induced in the windings of the secondary magnetic element 6 is rectified and fed to a DC/AC converter to drive any electrical load in need of electrical energy on the moveable element 2. Naturally the DC current from the rectifier may be used by a load directly if required.

Figure 6:
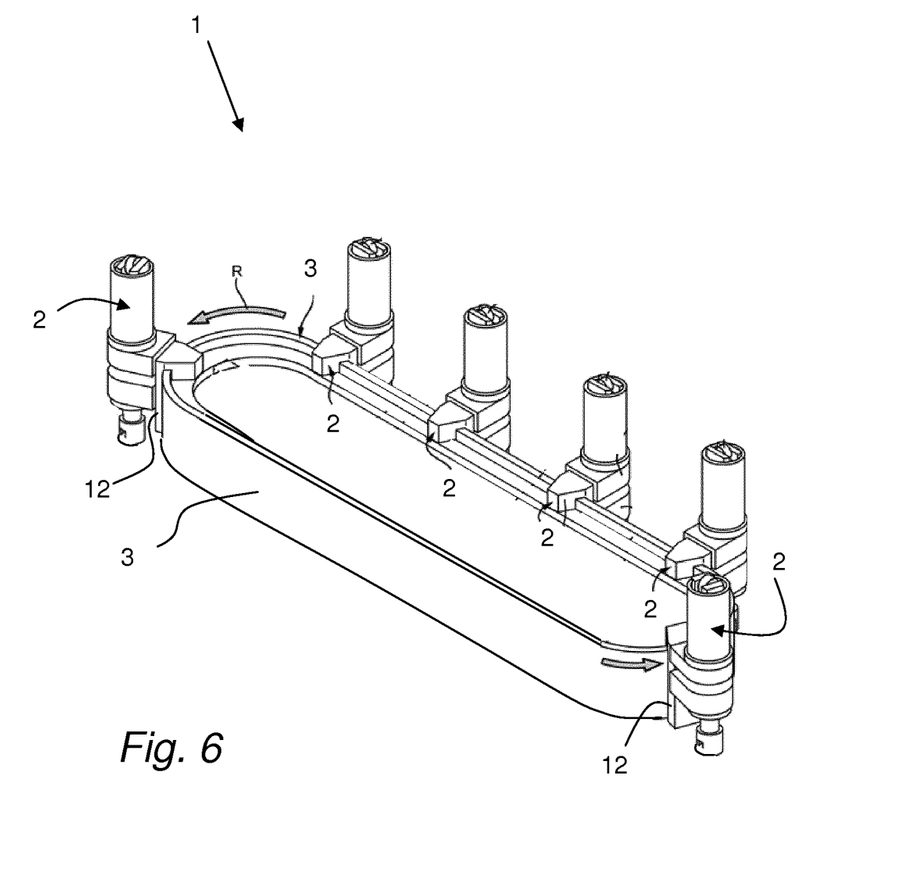
FIG. 6 is a drawing of one possible embodiment of a track for moveable elements using the drive system according to the present invention.

FIG. 6 is a drawing of one possible embodiment of a track for moveable elements 2 using the drive system 1 according to the present invention. Moveable elements 2 move along a track 3 in the direction R. The stators are integrated in the side 3 facing the mounting plates 12 of the moveable elements 2. The mounting plates 12 of each moveable element are of the type shown in FIGS. 2 and 3, i.e. they are equipped with both primary magnetic elements 5 in form of permanent magnets and secondary magnetic element 6a-6c for inductive energy transfer via the first sub-harmonic 9 of the magnetic field produced by the stators 4 in the track 3. The moveable elements 2 may be equipped with electrical tools like moulds, induction sealing jaws, cooling systems for other equipment or any other equipment. Electrical energy is thus wireless transmitted to the moveable elements 2 using the normally unwanted effects of the sub-harmonic of the magnetic field from the stators 4 of the synchronous machine drive system 1.

The invention claimed is:

1. A drive system for electromagnetic energy transfer, comprising:
   a track defining a predetermined path, the track including a plurality of stators, each stator having at least one electrical winding configured to generate a magnetic field having a fundamental harmonic signal and at least one sub-harmonic signal when supplied with a varying current;
   a movable magnetic device configured to move along the predetermined path in response to the generated magnetic field, the moveable magnetic device including:
      a primary magnetic component configured to receive the fundamental harmonic signal and configured to drive the movable magnetic device along the predetermined path, and
      a secondary magnetic component configured to receive the at least one sub-harmonic signal and configured to generate power for the movable magnetic device based on the received sub-harmonic signal; and
   a control unit configured to modulate the varying current to affect the at least one sub-harmonic signal and increase the power generated for the movable magnetic device.

2. The drive system according to claim 1, wherein the varying current is an alternating current.

3. The drive system according to claim 1, wherein at least one of the primary magnetic component and the secondary magnetic component includes a winding.

4. The drive system according to claim 1, wherein the movable magnetic device further comprises a plurality of primary magnetic components and secondary magnetic components alternately arranged along the movable magnetic device.

5. The drive system according to claim 4, wherein the secondary magnetic components each include a winding that defines a width that substantially scales to a distance between subsequent primary magnetic components, the width being based on a frequency ratio between the fundamental harmonic signal and the at least one sub-harmonic signal.

6. The drive system according to claim 1, wherein the movable magnetic device further comprises a mounting plate on which the primary magnetic component and the secondary magnetic component are mounted, the mounting plate comprising a slot for receiving the secondary magnetic component.

7. The drive system according to claim 6, wherein the mounting plate is made of a material having a high magnetic permeability.

8. The drive system according to claim 7, wherein the material is iron.

9. The drive system according to claim 1, wherein the stators are configured to successively receive successive phases of the varying current.

10. A linear fractional slot synchronous machine, comprising:
    the drive system according to claim 1.

11. A rotational synchronous machine, comprising:
    the drive system according to claim 1.

12. A movable magnetic device configured to move along a track in response to a generated magnetic field, the track defining a predetermined path and including a plurality of stators, each stator having at least one electrical winding configured to generate a magnetic field having a fundamental harmonic signal and at least one sub-harmonic signal when supplied with a varying current, the movable magnetic device comprising:

a primary magnetic component configured to receive the fundamental harmonic signal and configured to drive the movable magnetic device along the predetermined path of the track; and a secondary magnetic component configured to receive the at least one sub-harmonic signal and configured to generate power for the movable magnetic device;

wherein when the at least one sub-harmonic signal is increased, by a control unit configured to modulate the varying current, additional power is generated for the magnetic movable device.

13. The movable magnetic device according to claim 12, wherein at least one of the primary magnetic component and the secondary magnetic component includes a winding.

14. The movable magnetic device according to claim 12, wherein the movable magnetic device further comprises a plurality of primary magnetic components and secondary magnetic components alternately arranged along the movable magnetic device.

15. The movable magnetic device according to claim 14, wherein the secondary magnetic components each include a winding that defines a width that substantially scales to a distance between subsequent primary magnetic components, the width being based on a frequency ratio between the fundamental harmonic signal and the at least one sub-harmonic signal.

16. The movable magnetic device according to claim 12, further comprising: a mounting plate on which the primary magnetic component and the secondary magnetic component are mounted, the mounting plate comprising a slot for receiving the secondary magnetic component.

17. The movable magnetic device according to claim 16, wherein the mounting plate is made of a material having a high magnetic permeability.

18. The movable magnetic device according to claim 17, wherein the material is iron.

* * * * *